US012808849B2

(12) United States Patent
Ishida et al.

(10) Patent No.: US 12,808,849 B2
(45) Date of Patent: Nov. 24, 2026

(54) ROAD SURFACE CONDITION DETERMINATION DEVICE AND CONTROL DEVICE

(71) Applicant: BRIDGESTONE CORPORATION, Tokyo (JP)

(72) Inventors: Masami Ishida, Tokyo (JP); Tomoaki Nemoto, Tokyo (JP); Tomoaki Chikugo, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 19/105,036

(22) PCT Filed: Jun. 20, 2023

(86) PCT No.: PCT/JP2023/022799
§ 371 (c)(1),
(2) Date: Feb. 20, 2025

(87) PCT Pub. No.: WO2024/048024
PCT Pub. Date: Mar. 7, 2024

(65) Prior Publication Data

US 2025/0283855 A1 Sep. 11, 2025

(30) Foreign Application Priority Data

Aug. 31, 2022 (JP) ................................ 2022-138709

(51) Int. Cl.
*G01N 29/12* (2006.01)
*B60W 40/06* (2012.01)
*G01N 29/04* (2006.01)

(52) U.S. Cl.
CPC ............. *G01N 29/12* (2013.01); *B60W 40/06* (2013.01); *G01N 29/041* (2013.01)

(58) Field of Classification Search
None
See application file for complete search history.

(56) References Cited

U.S. PATENT DOCUMENTS 5,852,243 A * 12/1998 Chang .................... G01N 29/14 73/659
2004/0212516 A1 10/2004 Bhagavathula et al.
(Continued)

FOREIGN PATENT DOCUMENTS

DE 102015208364 A1 11/2016
DE 102019101129 A1 7/2020
(Continued)

OTHER PUBLICATIONS

Sep. 16, 2025, search result of the Extended European Search Report issued by the European Patent Office in the corresponding European Patent Application No. 23859794.2.
(Continued)

*Primary Examiner* — Hitesh Patel
*Assistant Examiner* — Elle Rose Knudson
(74) *Attorney, Agent, or Firm* — KENJA IP LAW PC

(57) ABSTRACT

A road surface condition determination device (10) is a road surface condition determination device that determines a condition of a road surface on which a vehicle is in motion, comprising a data acquisition section (131) that acquires sound data, including information on reflected sound of sound generated by the vehicle, which is collected by a data collection section installed on the vehicle, and a determination section (132) that determines the condition of the road surface based on presence or absence of a peak in a predetermined frequency range in the acquired sound data.

2 Claims, 5 Drawing Sheets

(56) References Cited

U.S. PATENT DOCUMENTS

| | | | | |
|---|---|---|---|---|
| 2011/0109448 | A1 | 5/2011 | Browne et al. | |
| 2012/0026771 | A1* | 2/2012 | Imura | B60L 3/0015 363/178 |
| 2013/0116972 | A1 | 5/2013 | Hanatsuka et al. | |
| 2016/0349219 | A1* | 12/2016 | Paturle | B60C 23/00 |
| 2021/0048527 | A1* | 2/2021 | Schumann | G01S 15/931 |

FOREIGN PATENT DOCUMENTS

| | | | |
|---|---|---|---|
| DE | 102019202079 | A1 | 1/2021 |
| JP | H0875711 | A | 3/1996 |
| JP | H08261993 | A | 10/1996 |
| JP | 2000046803 | A | 2/2000 |
| JP | 2003083943 | A | 3/2003 |
| JP | 2004198433 | A | 7/2004 |
| JP | 2005156236 | A | 6/2005 |
| JP | 3879924 | B2 * | 2/2007 |
| JP | 2011242303 | A | 12/2011 |
| JP | 2019167760 | A | 10/2019 |

OTHER PUBLICATIONS

Aug. 22, 2023, International Search Report issued in the International Patent Application No. PCT/JP2023/022799.

Mar. 1, 2025, International Preliminary Report on Patentability issued in the International Patent Application No. PCT/JP2023/022799.

* cited by examiner

ROAD SURFACE CONDITION DETERMINATION DEVICE AND CONTROL DEVICE

TECHNICAL FIELD

This disclosure relates to a road surface condition determination device and a control device.

BACKGROUND

Conventionally, technologies have been proposed for grasping road conditions so that road administrators and others can carry out traffic restrictions, maintenance, improvements, and the like without requiring a great deal of effort. For example, Patent Document 1 proposes a detection method that emits ultrasonic waves at the road surface, determines the acoustic impedance of the road surface from the reflectivity, and compares it with the standard acoustic impedance to identify the substance present on the road surface.

CITATION LIST

Patent Literature

PTL 1: JP H8-075711 A

SUMMARY

Technical Problem

In the case of an autonomous vehicle, the vehicle may make a decision on whether or not to continue driving automatically based on the road conditions from the perspective of safety. For this reason, there is a need for technology that can accurately estimate the road surface condition on which the vehicle is in motion. The technology described in Patent Document 1 requires a transmitter/receiver fixed to a support so that the distance to the road surface is known in order to transmit and receive ultrasonic waves. The distance between the vehicle and the road surface changes while the vehicle is in motion, and it is also difficult to retrofit a large device that emits ultrasonic waves to the chassis. For these reasons, it is difficult to apply the detection method in Patent Document 1 to vehicles.

The object of the present disclosure made in view of the above circumstances is to provide a road surface condition determination device and a control device that can estimate road surface condition with high accuracy using a simple configuration.

Solution to Problem (1) A road surface condition determination device according to one embodiment of the present disclosure is a road surface condition determination device that determines a condition of a road surface on which a vehicle is in motion, comprising a data acquisition section that acquires sound data, including information on reflected sound of sound generated by the vehicle, which is collected by a data collection section installed on the vehicle, and a determination section that determines the condition of the road surface based on presence or absence of a peak in a predetermined frequency range in the acquired sound data.

(2) As one embodiment of the present disclosure, in (1), the data acquisition section acquires air temperature data that includes information on ambient temperature of the road surface, and the determination section further determines the condition of the road surface based on the air temperature data.

(3) As one embodiment of the present disclosure, in (1) or (2), the predetermined frequency range includes a specific frequency of operating sound of an inverter provided on the vehicle.

(4) As one embodiment of the present disclosure, in (1) to (3), the determination section determines the condition of the road surface while the vehicle is in motion.

(5) A control device according to one embodiment of the present disclosure is a control device installed in a vehicle and controls the vehicle, that comprises a data acquisition section that acquires sound data, including information on reflected sound of sound generated by the vehicle, which is collected by a data collection section installed on the vehicle; and a determination section that determines the condition of the road surface, on which the vehicle is in motion, based on presence or absence of a peak in a predetermined frequency range in the acquired sound data, and controls the vehicle based on the condition of the road surface that has been determined.

Advantageous Effect

According to this disclosure, it is possible to provide a road surface condition determination device and a control device that can estimate road surface condition with high accuracy using a simple configuration.

DETAILED DESCRIPTION

The following is an explanation of a road surface condition determination device and a control device in accordance with one embodiment of the present disclosure, with reference to the drawings. The same or equivalent parts in each drawing are marked with the same symbol/numeral. In the description of this embodiment, the description of the same or corresponding parts will be omitted or simplified as appropriate.

Figure 1:
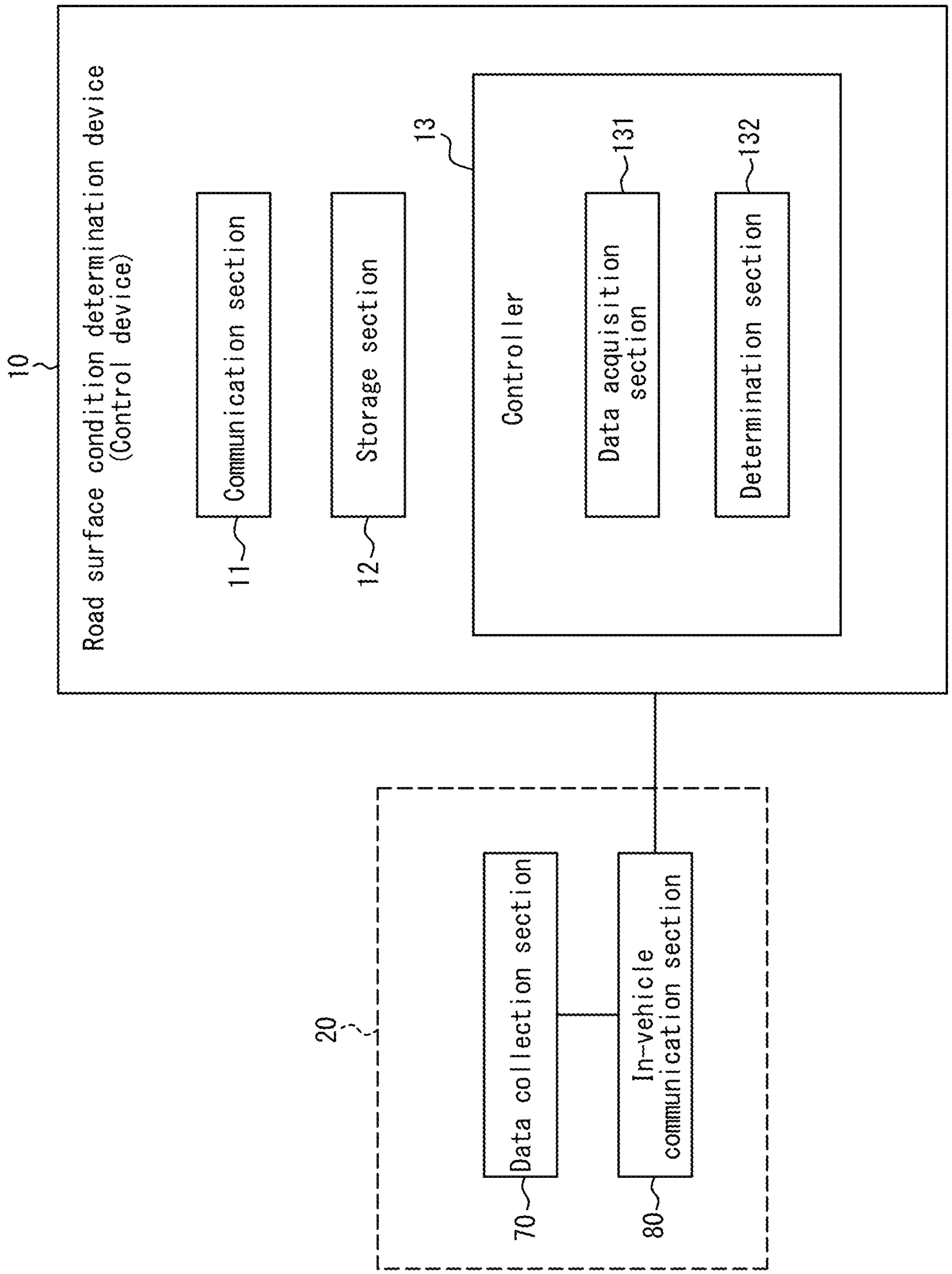
FIG. 1 is a drawing that illustrates an exemplary configuration of a road surface condition determination system, including a road surface condition determination device.
Figure 2:
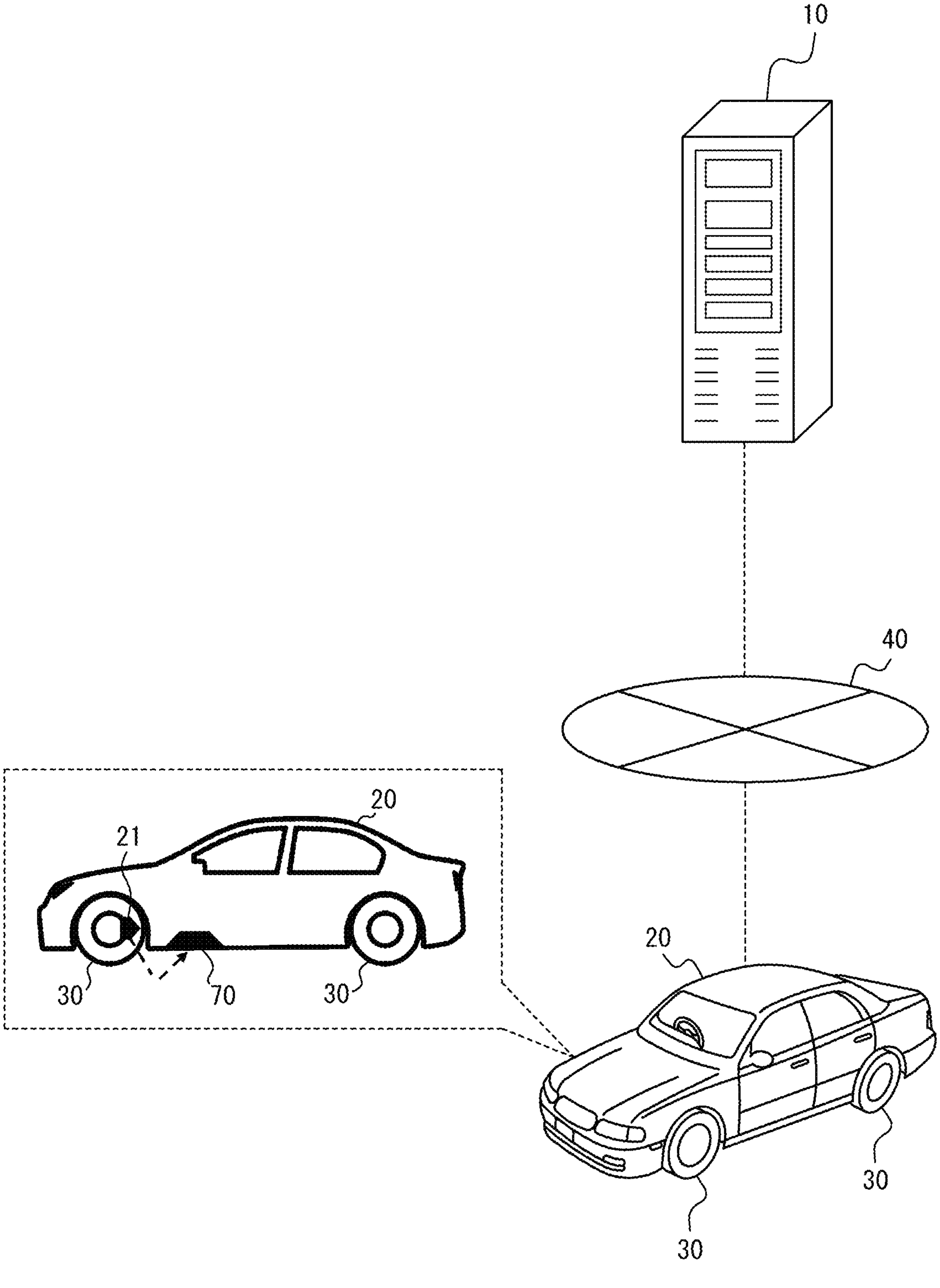
FIG. 2 is another drawing that illustrates the exemplary configuration of the road surface condition determination system in FIG. 1.

FIGS. 1 and 2 are drawings that illustrate an exemplary configuration of a road surface condition determination system. The road surface condition determination system includes a road surface condition determination device 10. FIG. 1 is a block diagram that includes an example of the internal configuration of the road surface condition determination device 10. FIG. 2 illustrates the overall configuration of the road surface condition determination system.

The road surface condition determination device 10 according to this embodiment is a device that determines the condition of the road surface on which a vehicle 20 is in motion. Although the details will be described later, the road surface condition determination device 10 determines (estimates) the road surface condition based on information about reflected sound of the sound generated by the vehicle 20. The road surface condition refers to the condition of the road surface, and in this embodiment, it is classified into four categories: "Dry", "Wet", "Ice" and "Snow". The road surface condition is not limited to these four categories, and for example, some categories may be omitted, or further categories may be included, such as a category to distinguish between paved roads and gravel roads. The "Dry" indicates that the road surface is dry. The "Wet" indicates that the road surface is wet. The "Ice" indicates that the road surface is frozen. The "Snow" indicates that the road surface is covered in snow. In addition, in the description of this disclosure, the sound is not limited to those with frequencies in the audible range, and includes those in the range exceeding 20 kHz, for example. In addition, the operating sound refers to the sound produced by the operation of a device, and includes noise.

The road surface condition determination device 10 comprises a communication section 11, a storage section 12, and a controller 13. The controller 13 comprises a data acquisition section 131 and a determination section 132. The road surface condition determination device 10 may be, for example, a computer in terms of its hardware configuration. The details of the components of the road surface condition determination device 10 are described later.

The road surface condition determination device 10 may constitute a road surface condition determination system together with at least one of the devices installed in the vehicle 20 (a data collection section 70 and an in-vehicle communication section 80) which are connected to the network 40. The network 40 is the Internet, for example. Here, the vehicle 20 is not limited to a specific type of vehicle, and may be a passenger car, a truck, a taxi, or a bus, for example. In this embodiment, the vehicle 20 is described as an electric vehicle with an automatic driving function, however, it does not have to have an automatic driving function, and it may be a hybrid vehicle, for example.

In this embodiment, the vehicle 20 comprises the data collection section 70 and the in-vehicle communication section 80. The data collection section 70 collects sound data that includes information on the reflected sound of the sound generated by the vehicle 20. The data collection section 70 is attached to the vehicle 20 and includes a microphone in this embodiment, but is not limited to this. As explained below, it is necessary to collect the intensity of sound of a specific frequency as the sound data, and the data collection section 70 may include a device that can detect the sound of the specific frequency other than a microphone. For example, the data collection section 70 may be configured to include a cavity resonator, a resonator, or a pressure sensor instead of a microphone. For example, the cavity resonator may be an air column resonator with a tube length equal to one quarter of the wavelength of the specific frequency. The cost of the data acquisition section 70 may be reduced by using a cavity resonator and others instead of a microphone.

Figure 3:
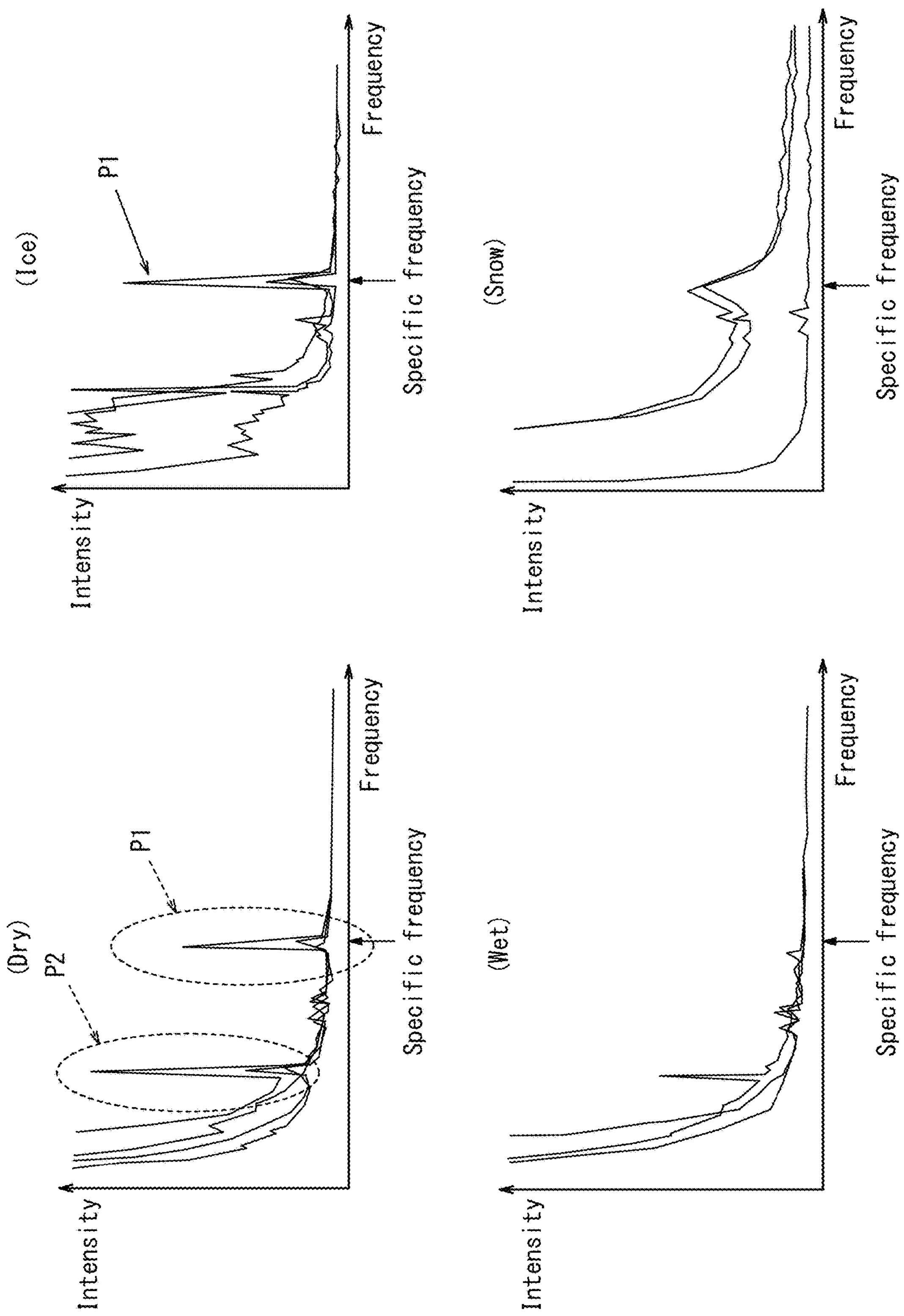
FIG. 3 is a drawing that illustrates an example of the frequency spectrum of sound in a vehicle.

As illustrated in FIG. 2, in this embodiment, the microphone, which is the data collection section 70, is attached to the vehicle 20 so that it faces the road surface and picks up reflected sound from the road surface. Here, FIG. 3 illustrates an example of the frequency spectrum of the sound in the vehicle 20. The vertical axis indicates signal strength (sound strength). The horizontal axis indicates frequency. The sounds in the vehicle 20 include sounds of various frequencies, such as the sound emitted from the vehicle 20 and mainly reflected by the road surface, as well as noise while the vehicle is in motion, and have different characteristics depending on the road surface condition. As illustrated in FIG. 3, peaks (sharp changes such as P1 and P2) that are not present in the Wet and Snow are seen in the Dry and Ice. The inventor analyzed the data in more detail and found that when the road surface condition is Dry or Ice, there is a peak (P1) at a specific frequency in a high-frequency range, and that even when the vehicle 20 is in motion, it is possible to detect the peak (P1) without being affected much by noise such as running sound. Here, the high-frequency range is not limited to a specific frequency band, but is generally 5 kHz or higher. In the Dry, another peak (P2) can also be seen, but this is at a low frequency that is not in the high-frequency range, and it may not be detected due to the influence of noise such as running sound. When the inventor conducted further analysis, it was found that the peak (P1) at the specific frequency was largely due to the operating sound of an inverter 21 provided in the vehicle 20 (see FIG. 2). The inverter 21 is a device that converts direct current power from the battery into alternating current power to drive the motor provided in the tire 30. There may be fluctuations in the specific frequency depending on vehicles, as there are individual differences in the operating sound of inverters 21, however, the specific frequencies are generally about several kHz to several tens of kHz. Therefore, it is possible to collect sound data using the data collection section 70 and determine the road surface condition based on the presence or absence of a peak in the predetermined frequency range that includes the specific frequency of the operating sound of the inverter 21 provided in the vehicle 20. The details of the road surface condition determination will be described later.

The in-vehicle communication section 80 outputs the sound data, including the information on the reflected sound of the sound generated by the vehicle 20, which is collected by the data collection section 70, to the road surface condition determination device 10. The in-vehicle communication section 80 may, for example, be configured as a wireless communication module, but is not limited to a specific device. In this embodiment, the in-vehicle communication section 80 is configured to be able to communicate with the road surface condition determination device 10 via the network 40.

Here, the data collection section 70 may include a temperature sensor to further collect air temperature data. The air temperature data includes information on the ambient temperature of the road surface. In this case, the in-vehicle communication section 80 also outputs the air temperature data to the road surface condition determination device 10.

The following explains the details of the components of the road surface condition determination device 10. The communication section 11 is configured to include one or more communication modules that connect to the network 40. The communication section 11 may include a communication module that supports mobile communication standards such as 4G (4th Generation) and 5G (5th Generation). The communication section 11 may include a communication module that supports wireless LAN standards (for example, IEEE 802.11). In addition, the communication section 11 may include a communication module that corresponds to a wired LAN standard, for example.

The storage section 12 is one or more memories. The memories can be, for example, semiconductor memories, magnetic memories, or optical memories, however, they are not limited to these and can be any memory. The storage section 12 is, for example, built into the road surface condition determination device 10, however, the storage section 12 can also be configured to be accessed externally by the road surface condition determination device 10 via an arbitrary interface.

The storage section 12 stores various data used in the various calculations performed by the controller 13. In addition, the storage section 12 may also store the results of various calculations and intermediate data executed by the controller 13. In this embodiment, the storage section 12 stores information on the specific frequency of the vehicle 20 and the predetermined frequency range that includes the specific frequency. Since the specific frequency can vary depending on the vehicle 20, it is preferable that it be identified based on measurements of the operating sound of the inverter 21, etc., before the road surface condition is determined, and that the information be stored in the storage section 12.

The controller 13 is one or more processors. The processor may be, for example, a general-purpose processor or a dedicated processor specialized for a particular process, however, it is not limited to these and may be any processor. The controller 13 controls the overall operation of the road surface condition determination device 10.

Here, the road surface condition determination device 10 may have the following software configuration. One or more programs used to control the operation of the road surface condition determination device 10 are stored in the storage section 12. When the program stored in the storage section 12 is read by the processor in the controller 13, the program makes the controller 13 function as the data acquisition section 131 and the determination section 132.

The data acquisition section 131 acquires the sound data, including the information on the reflected sound of the sound generated by the vehicle 20, collected by the data acquisition section 70 installed in the vehicle 20. The data acquisition section 131 may acquire air temperature data. The data acquisition section 131 may acquire the air temperature data collected by the data collection section 70 when the data collection section 70 includes a temperature sensor. In addition, when the data collection section 70 does not include a temperature sensor, the data acquisition section 131 may acquire air temperature data contained in the weather information via the network 40. In addition, the data acquisition section 131 may acquire information from the storage section 12 on the specific frequency of the vehicle 20 and the predetermined frequency range that includes the specific frequency. The data acquisition section 131 outputs the acquired data and others to the determination section 132.

The determination section 132 determines the condition of the road surface based on the presence or absence of a peak in the predetermined frequency range in the acquired sound data. The determination section 132 may generate a frequency spectrum such as the one illustrated in FIG. 3, for example, from the sound data. The determination section 132 extracts the predetermined frequency range from the frequency spectrum and determines the presence or absence of a peak in the predetermined frequency range. The determination of the presence or absence of a peak may be performed using a known method, and is not limited to a specific method. For example, the determination section 132 may extract the maximum value for the intensity and determine whether the frequency corresponding to the maximum value matches the specific frequency. In addition, the determination section 132 may, for example, subtract the intensity of the frequencies around (before and after) the extracted maximum value from the maximum value, and may determine that a peak (sharp change) has occurred when the value is equal to or greater than a threshold value. The determination section 132 can determine that the road surface is Dry or Ice if there is a peak in the predetermined frequency range. On the contrary, the determination section 132 can determine that the road surface is Wet or Snow if there are no peaks in the predetermined frequency range. For example, in the summer season, the determination section 132 may determine the condition of the road surface to be Dry if there is a peak in a predetermined frequency range, and to be Wet if there is no peak.

The determination section 132 may further determine the condition of the road surface based on air temperature data. By using the air temperature data in combination, the determination section 132 can estimate the condition of the road surface in even finer categories. Table 1 provides the method for determining the road surface condition in the determination section 132 when using the air temperature data in combination. In Table 1, the "Low" air temperature means, for example, 0° C. or below, and all others are indicated as "normal".

TABLE 1

| Peak in predetermined frequency range | Air temperature | Road surface consition |
|---|---|---|
| Yes | Normal | Dry |
| No | Normal | Wet |
| Yes | Low | Ice |
| No | Low | Snow |

In this way, the predetermined frequency range includes the specific frequency of the operating sound of the inverter 21 provided in the vehicle 20, and the presence or absence of a peak at the specific frequency is used for the determination. As mentioned above, the predetermined frequency range corresponds to the high-frequency range, which is not greatly affected by noise such as running sound. Therefore, in this embodiment, it is possible to estimate the road surface condition with high accuracy by using a determination that uses a frequency range that includes the specific frequency that is less affected by noise while the vehicle is in motion. In other words, the road surface condition determination device 10 of this embodiment is suitable for estimating the road surface condition while the vehicle 20 is in motion.

Here, for example, the controller 13 may warn the driver of the vehicle 20 to switch to manual driving if it determines that the road surface condition on the road on which the vehicle 20 is in motion automatically is Ice or Snow. In this way, the road surface condition determination device 10 may function as a control device that controls the vehicle 20 based on the road surface condition that has been determined.

Figure 4:
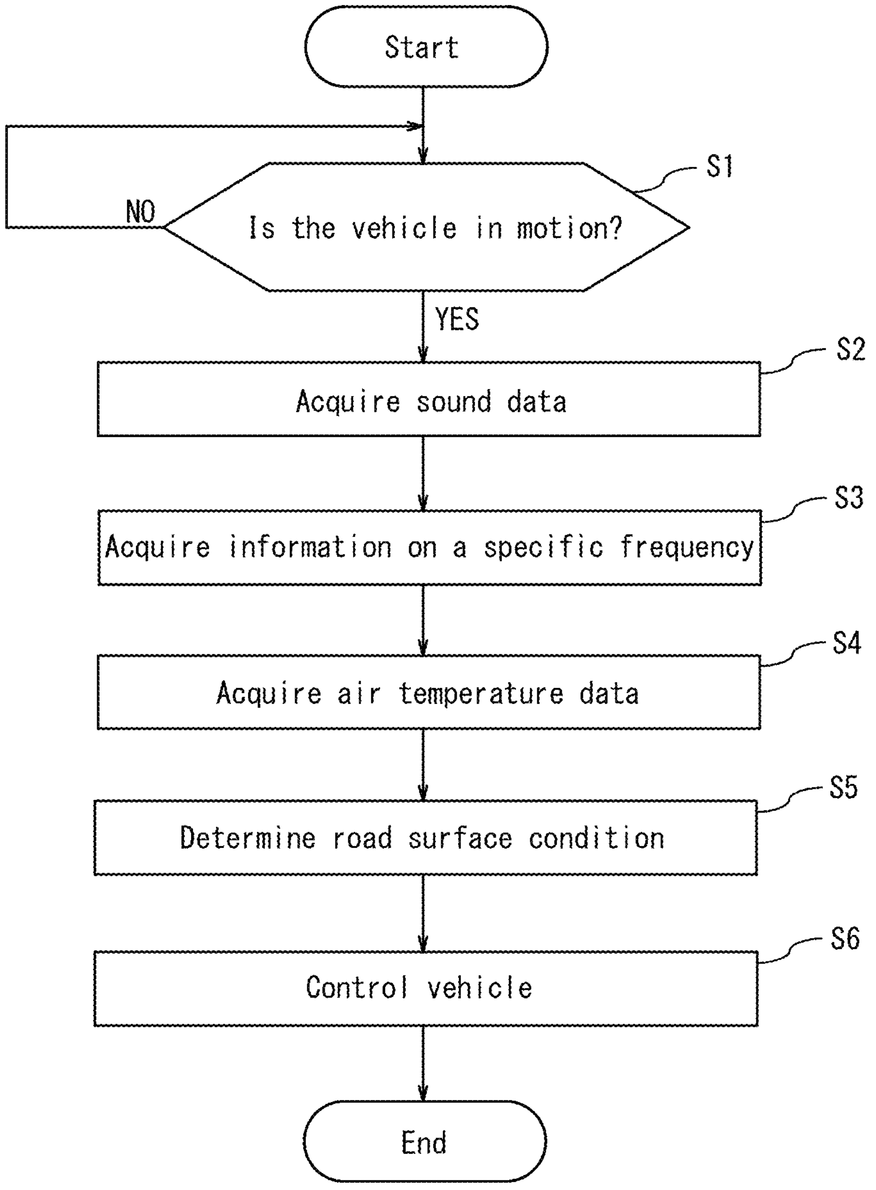
FIG. 4 is a flowchart that illustrates an example of the process for determining road surface condition.

FIG. 4 is a flowchart that provides an example of the process for determining road surface condition executed by the road surface condition determination device 10.

The road surface condition determination device 10 waits until the vehicle 20 starts to move (No in step S1). When the vehicle 20 starts to move (YES in step S1), the road surface condition determination device 10 starts the process of determining the road surface condition. Here, as mentioned above, the peak at the specific frequency (P1 in FIG. 3) is largely due to the operating sound of the inverter 21 provided in the vehicle 20. The inverter 21 operates while the vehicle 20 is in motion, and the operating sound becomes loud. Therefore, if the vehicle 20 is in motion, it will be possible to detect strong reflected sound at the specific frequency, and it will be possible to accurately estimate the road surface condition.

The road surface condition determination device 10 acquires the sound data that includes information on the reflected sound of the sound generated by the vehicle 20 (step S2). In addition, the road surface condition determination device 10 acquires information on the specific frequency from the storage section 12 (step S3). In addition, the road surface condition determination device 10 acquires the air temperature data that includes information on the ambient temperature of the road surface on which the vehicle 20 is in motion (step S4).

The road surface condition determination device 10 determines the road surface condition based on the presence or absence of a peak in the predetermined frequency range of the sound data and the air temperature data, as illustrated in Table 1 (step S5).

The road surface condition determination device 10 controls the vehicle 20 based on the condition of the road surface that has been determined (estimated) (step S6).

As described above, the road surface condition determination device and the control device according to this embodiment do not require, for example, a device for emitting ultrasonic waves, and it is possible to estimate the road surface condition with high accuracy using a simple configuration. In addition, the control device according to this embodiment can, based on the estimated road surface condition, for example, determine whether or not to continue with automatic driving, and can control the vehicle 20 to drive safely.

The embodiments of the present disclosure have been described based on the various drawings and examples, however, it should be noted that a person skilled in the art would be able to easily make modifications and alterations based on the present disclosure. Therefore, it should be noted that such modifications and alterations are included within the scope of this disclosure. For example, the functions contained in each component or each step, etc. can be rearranged so that they do not contradict logically, and it is possible to combine multiple components or steps, etc. into one or split them into multiple components or steps, etc. The embodiments of the present disclosure may also be realized as a program executed by a processor provided in a device, and a storage medium having the program recorded thereon.

Figure 5:
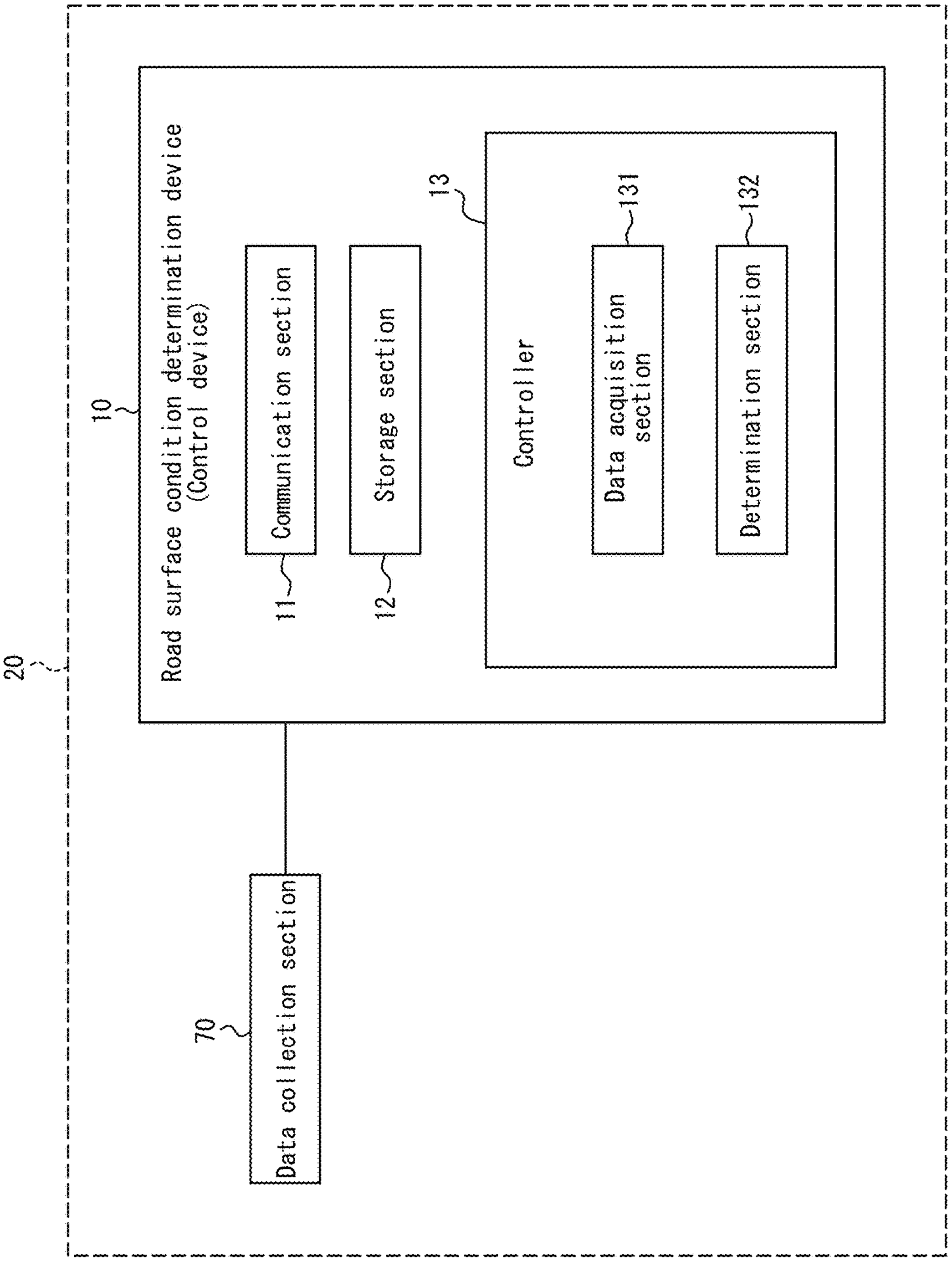
FIG. 5 is a drawing that illustrates another exemplary configuration of a road surface condition determination system, including a road surface condition determination device.

The configuration of the road surface condition determination device 10 and the road surface condition determination system illustrated in FIGS. 1 and 2 are just one example, and the present disclosure is are not limited to the configuration illustrated in FIGS. 1 and 2. For example, the road surface condition determination device 10 may be installed in the vehicle 20. As illustrated in FIG. 5, when the road surface condition determination device 10 is installed in the vehicle 20, the road surface condition determination device 10 can acquire sound data, etc., without going through the in-vehicle communication section 80 and the network 40. The road surface condition determination device 10 may acquire the sound data, etc. from the data collection section 70 using an in-vehicle network such as CAN (Controller Area Network).

In addition, the specific frequency is not limited to the frequency of the operating sound of the inverter 21, but is any sound emitted by the vehicle 20 that shows a peak in the high-frequency range. Therefore, even for vehicles 20 that do not have inverters 21, if they have a peak in the high-frequency range that is not easily affected by noise such as running sound, the above-mentioned road surface condition determination method can be applied by setting the frequency of the sound that indicates the peak to the specific frequency.

REFERENCE SIGNS LIST

10 Road surface condition determination device
11 Communication section
12 Storage section
13 Controller
20 Vehicle
21 Inverter
30 Tire
40 Network
70 Data collection section
80 In-vehicle communication section
131 Data acquisition section
132 Determination section

The invention claimed is:

1. A control device installed in a vehicle and controlling the vehicle, comprising a storage section that stores information on a predetermined frequency range that includes a specific frequency of operating sound of an inverter provided on the vehicle, which is measured before a condition of a road surface is determined;

a data acquisition section that acquires sound data, including information on reflected sound of sound generated by the vehicle, which is collected by a data collection section installed on the vehicle; and a determination section that determines the condition of the road surface, on which the vehicle is in motion, based on presence or absence of a peak at the specific frequency in the acquired sound data, wherein the control device controls the vehicle based on the condition of the road surface that has been determined.

2. The control device as described in claim 1, wherein the data acquisition section acquires air temperature data that includes information on ambient temperature of the road surface, and the determination section further determines the condition of the road surface based on the air temperature data.

* * * * *